Sept. 29, 1925.
G. A. JOHNSON ET AL
1,555,581
CAR CONSTRUCTION
Filed March 14, 1924
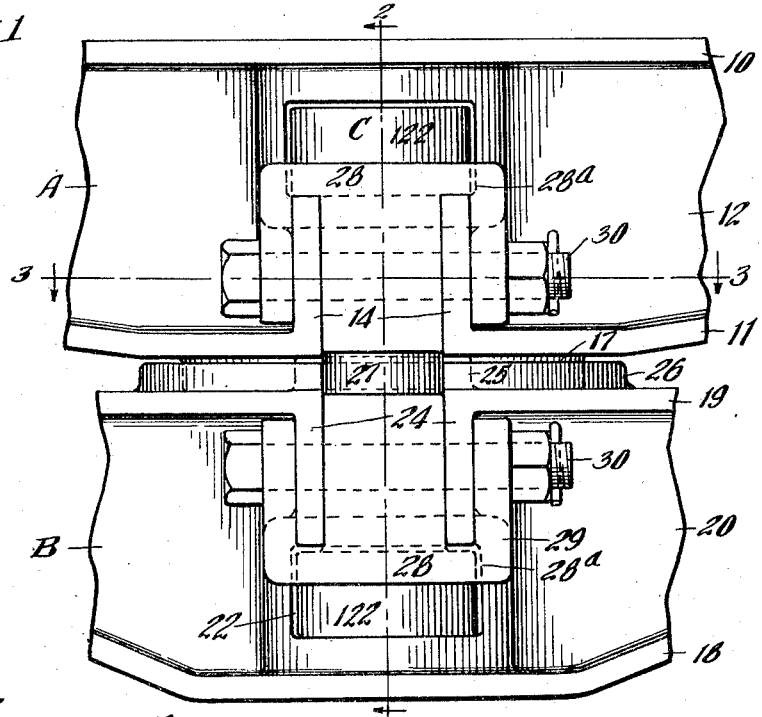
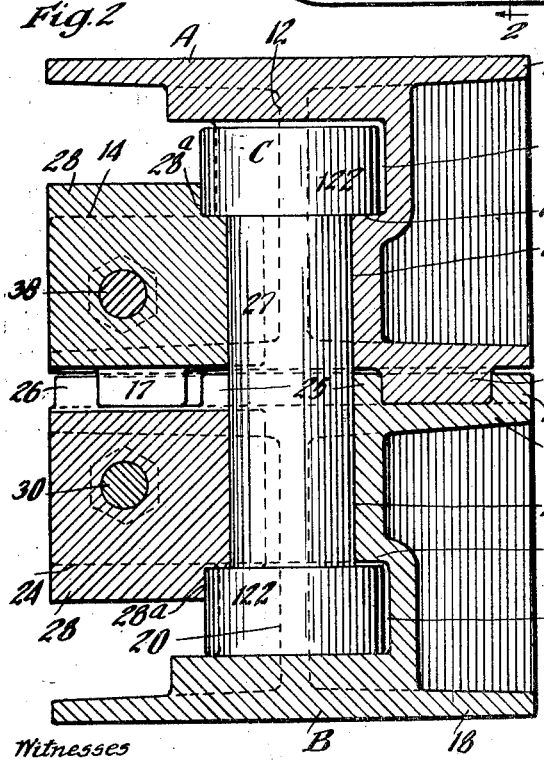
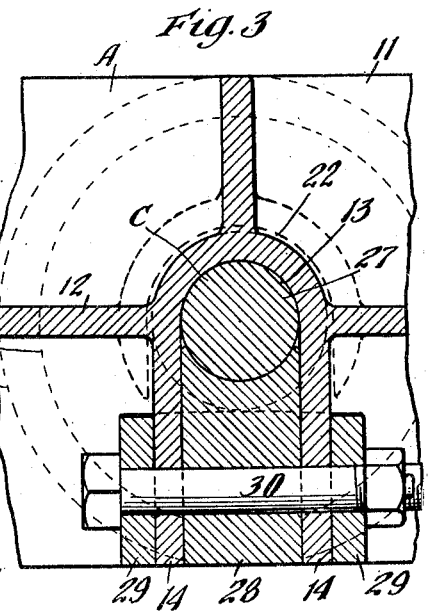
Witnesses
Wm. Geiger
Marjorie Armstrong
Inventors
George A. Johnson
John F. O'Connor
By Geo. T. Haight
Their Atty Patented Sept. 29, 1925.

1,555,581

UNITED STATES PATENT OFFICE.

GEORGE A. JOHNSON AND JOHN F. O'CONNOR, OF CHICAGO, ILLINOIS, ASSIGNORS, BY MESNE ASSIGNMENTS, TO W. H. MINER, INC., A CORPORATION OF DELAWARE.

CAR CONSTRUCTION.

Application filed March 14, 1924. Serial No. 699,178.

*To all whom it may concern:*

Be it known that we, GEORGE A. JOHNSON and JOHN F. O'CONNOR, citizens of the United States, residing at Chicago, in the county of Cook and State of Illinois, have invented a certain new and useful Improvement in Car Construction, of which the following is a full, clear, concise, and exact description, reference being had to the accompanying drawings, forming a part of this specification.

This invention relates to improvement in car construction.

In the operation of railroads, experience has shown the advisability of so connecting the body and truck bolsters of a car that they cannot separate vertically in the event of collision or derailment, since this prevents or minimizes the turning over or telescoping of the cars.

Heretofore, several expedients have been employed or suggested to overcome the difficulty above indicated but, so far as we are aware, no one has ever heretofore employed a locking king pin or other structure which would afford a true 100% effective resistance against shear in both horizontal and vertical directions, on account of the practical difficulties which are encountered in applying such a locking device to car constructions in service. Furthermore, in certain types of cars, particularly those having six wheel trucks such as passenger cars, buffet cars, dining cars and mail cars, it has been found extremely difficult to employ any satisfactory form of locking device because of the inaccessibility to the king pin openings due to the location of the center axle of the truck immediately below the king pin opening and, in some of the cars, inability to obtain access from points above the king pin openings.

One object of our invention is to provide an improved construction wherein provision is made for effectively interlocking the body and truck bolsters against accidental vertical separation while at the same time permitting the necessary turning movement of the truck with respect to the car body, which construction will afford a full 100% value of the inter-locking member against shear in either a horizontal direction or in a vertical direction, to thereby insure maximum beneficial results in the event of accident.

A still further object of our invention is to provide a construction having the characteristics set forth in the preceding paragraph and which will be readily adaptable to all types of car constructions whether four-wheel or six-wheel trucks are employed and whether or not access may be had from either below or above the king pin opening.

In the drawing forming a part of this specification, Figure 1 is an elevational view of the body and truck bolsters of a railway car, showing our improvements in connection therewith. Figure 2 is a vertical sectional view taken substantially on the line 2—2 of Figure 1. And Figure 3 is a horizontal sectional view taken substantially on the line 3—3 of Figure 1.

In said drawing, A denotes broadly the body bolster of a railway car; B the truck bolster; and C the king pin or center pin, interlocking said bolster against vertical separation.

The body bolster A is formed with a top tension flange 10, a bottom compression flange 11, and a vertically extending web 12, connecting said flanges. A vertically extending recess 13, substantially semi-circular in horizontal cross-section, is provided at the center of the body bolster, said recess starting from slightly below the under side of the top flange 10 and being open vertically along one side. A pair of side arms or lugs 14 extend horizontally and parallel to one another, from the bolster, at the open side of said recess to form a pin-receiving guide, as will be hereinafter described. The upper end of said substantially semi-circular recess 13 is annularly enlarged as at 15 to provide an upwardly facing annular shoulder 16.

On its bottom face, the body bolster is provided with an integral annular wide rib 17, concentric with the opening or recess 13, to act as one of the usual center bearing plates. This annular rib is open for a short distance in alinement with the open side of the recess 13.

The truck bolster B may be either in the form of a spider as for instance when this bolster is to be used for a six-wheel truck, or it may be as shown, said bolster having a bottom tension flange 18, a top compression flange 19, and a vertical web 20 connecting said flanges. At the center of said truck bolster there is provided a vertically extending, substantially semi-circular recess 21, said recess being annularly enlarged at its lower end as at 22 to provide a downwardly facing annular shoulder 23 similar to the shoulder 16 of the body bolster. The recess 21 is also open along one side vertically thereof, and said bolster is provided with parallel arms or lugs 24 extending laterally from one side of the recess, similar to arms 14 of the body bolster.

On its upper face, the truck bolster B is provided with concentric inner and outer annular ribs 25 and 26 concentric with the opening or recess 21 and so spaced as to provide an annular groove for the reception of the body bolster rib 17, to thereby complete the center bearing for the two bolsters. Said ribs 25 and 26 are also left open at one side in alinement with the recess 21, as clearly indicated in Figure 1.

To interlock the body and truck bolster against vertical separation but at the same time allow them to pivot relatively of one another preferably employ the following arrangement. A heavy king pin C is used, the same having a main cylindrical body portion or shank 27 of uniform cross-section from end to end and integral, annular enlargements or heads at its ends, thereby forming a double-headed king pin or center pin. The distance between the heads of the pin is but slightly greater than the distance between the annular shoulders 16 and 23 of the bolsters when assembled, as shown in Figure 2. To insert the king pin into the position shown in Figure 2 it is moved laterally through the vertically aligned upper and lower pairs of parallel arms or lugs of the bolsters until it is at its innermost position, fitting in the vertically aligned openings, as shown in Figure 2, the heads of the pin being in the annular enlargements of the openings, and engageable against the adjacent bolster shoulders.

In order to removably secure the locking pin in position we have arranged the following means:

A filler block 28 is provided with side arms 29, the width of the filler block being equal to the distance between the opposed arms of each pair of arms 14 and 24, respectively, the inner face of said filler block being made arcuate so as to cooperate with and fit snugly against the body of the king pin, the top of said block being recessed as indicated at 28ª to provide an annular shoulder therefor, as shown in Figure 3. The integral arms 29 of the filler block are adapted to overlie the arms 14 of the body bolster, and all of said arms and the filler block are provided with aligned apertures thru which a bolt 30 may be positioned to detachably lock the parts in their assembled relation.

A similar filler block 28 is employed in connection with the truck bolster B, the position of said lower block 28 being inverted with respect to the upper block 28 and fitting over and secured to the arms 24 with a similar bolt and nut as will be clearly understood from an inspection of Figure 1.

From the preceding description considered in connection with the drawing, it will be noted that the inter-locking arrangement which we have provided, affords a full 100% resistance to shear in a horizontal direction of the locking pin or bolt C, for any given diameter. Furthermore, the two annular heads 122 each affords a full 100% resistance value against shearing in a vertical direction, which we believe to be entirely new with us in car construction, and which is an extremely important factor in the practical operation of railroad cars in the event the cars are subjected to a severe shock or collision. Furthermore, it will be seen that, although we provide for an opening laterally from each of the bolsters in the portions thereof which are subjected to compression, we have so arranged the filler blocks as to fully compensate for any weakness which might otherwise be present in the compression member of the bolsters. Stated in another manner, each filler block 28 replaces the metal omitted from the compression section of the bolster so that, when said section of the bolster is subjected to compression, the blocks 28 are under compression between the respective arms and flanges of the bolster without diminution of the compression strength of the bolsters. It will also be seen that the blocks 28, which would necessarily be subjected to some pull from portions of the heads 122 of the bolt which engage them, in the event of a force tending to separate the bolsters, are not only securely held by heavy bolts which are in quadruple shear, but the blocks have been so assembled with the arms 14 and 24 as to utilize the strength of the latter also in resisting vertical movement of the blocks relative to the respective bolsters, all of which factors contribute to an unusually substantial and effective arrangement for the purpose intended.

We have herein shown and described what we now consider the preferred manner of carrying out the invention but the same is merely illustrative and we contemplate all changes and modifications that come within the scope of the claims appended hereto.

We claim:

1. In car construction, the combination with a body member and a truck member having alined king pin receiving openings, the body member having a continuous annular upwardly facing shoulder at the top of its king pin receiving opening, and said truck member having a continuous annular downwardly facing shoulder at the bottom of its king pin receiving opening, said annular shoulder and king pin opening of each of said members being defined, in part, by a detachable section to permit insertion and removal of a king pin: and a king pin received within said alined openings of said members, said king pin having top and bottom heads rigid with the shank of the king pin, each of said heads providing a continuous annular shoulder co-operable with the corresponding annular shoulder of said members.

2. In car construction, the combination with a body bolster and a truck bolster having vertically aligned recesses at their centers, said recesses being open vertically at one side, the upper flange of the body bolster and the bottom flange of the truck bolster overhanging said openings; of a locking pin insertable into said recesses from their open sides; and removable means for closing said open sides and interlocking with said bolster to hold said pin in place.

3. In car construction, the combination with a body bolster and a truck bolster having vertically aligned recesses at their centers, said recesses being open vertically along one side and being arcuate in radial cross-section, the top flange of said body bolster and the bottom flange of said truck bolster overlying said openings; of a locking pin insertable into said recesses from their open sides; and removable means having arcuate faces engageable against said pin for closing said open sides of said recesses, and interlocking with said bolsters to hold said pin in place.

4. In car construction the combination with opposed body and truck bolsters having vertically aligned recesses at their centers; said recesses being substantially semi-circular in radial cross-section and open on one side, the top flange of the body bolster and the bottom flange of the truck bolster being imperforate at said recesses of a circular cross-section locking pin insertable laterally into said recesses from their open sides; and filler blocks insertable laterally into said open sides of said recesses and having arcuate inner faces opposed to said semi-circular recesses so as to form circular openings together therewith, in which to snugly receive said pin, and detachably interlock it with said bolsters.

5. In car construction, the combination with a body bolster and a truck bolster, having aligned openings at their centers and provided with upwardly and downwardly facing shoulders respectively at the top and bottom of said openings: of a solid locking pin extending through said opening and provided with top and bottom heads integral therewith, each of said heads being engageable against the adjacent bolster shoulder, and means for detachably securing said pin in position.

6. In car construction, the combination with a body bolster and a truck bolster, having vertically extending aligned openings at their centers, said recesses being open vertically along one side and being annularly enlarged at their top and bottom ends to form shoulders thereat, the upper flange of the body bolster and the lower flange of the truck bolster being imperforate at their centers, of a double-headed locking pin inserted laterally through the open sides of both of said recesses so that said heads are engageable to seat on said shoulders, the ends of said heads lying in said enlarged portion of said recesses and being closely adjacent the imperforate center portion of said bolsters.

7. In car construction, the combination with a body bolster and a truck bolster; of a locking pin for interconnecting said bolster at their centers; and means for removably holding said pin in position, each of said bolsters being recessed to receive said pin laterally therein, and having laterally extending parallel arms forming guides for the insertion of said pin laterally into said recesses said means being removably secured to said arms to lock said pin against removal.

8. In car construction, the combination with a body bolster and a truck bolster; of a locking pin for interconnecting said bolsters at their centers: said bolsters being recessed from one side to receive said pin therein, and each having a pair of arms extending laterally from the open side of said recess, forming guides for the insertion of said pin laterally into said recesses; and means adapted to be removably secured to each pair of said arms to lock said pin in place, said means comprising a filler block fitting between said pair of arms and being arcuate at its inner end to snugly engage said pin, arms carried by each block to overlie the outer faces of said pair of arms on the bolster, and a bolt removably interlocking each block and bolster.

9. In car construction, the combination with a body member and a truck member having alined king pin receiving openings, the body member having a continuous annular upwardly facing shoulder at the top of its king pin receiving opening, and said truck member having as continuous annular downwardly facing shoulder at the bttom of its king pin receiving opening, said annular shoulder and king pin opening of each of said members being defined, in part, by a detachable section to permit insertion and removal of a king pin; a king pin received within said alined openings of said members, said king pin having top and bottom heads rigid with the shank of the king pin, each of said heads providing a continuous annular shoulder co-operable with the corresponding annular shoulder of said members; and means for rigidly attaching each of said removable sections to its respective member, each of said means being under multiple shear.

10. In a car construction, the combination with a body bolster and a truck bolster; of a pin for connecting said bolsters, said pin having a head adapted to co-operate with means on the body bolster for preventing removal of the pin in a vertical direction; and detachable means engaging the pin for preventing lateral displacement of the same and thereby prevent disengagement of said head and said means on the body bolster.

11. In a car construction, the combination with a body bolster and a truck bolster; of a pin for connecting said bolsters, said pin being accommodated in sockets in the body and truck bolsters; inter-engaging means on said pin and body and truck bolsters to prevent vertical separation of said bolsters; and detachable means for preventing lateral movement of said pin in said sockets to thereby maintain said inter-engaging means operative.

12. In a car construction, the combination with a body bolster and a truck bolster; of a pin for connecting the said bolsters, said pin being headed at the opposite ends thereof; a laterally opening socket formed in each bolster, adapted to receive the shank of the pin, said pin being insertable laterally into said sockets; means on said bolsters adjacent said sockets co-operating with the heads of the pin to prevent vertical separation of said bolsters; and detachable means for holding said pin within said sockets against lateral displacement.

13. In a car construction, the combination with a body bolster and a truck bolster, said bolsters each having a laterally opening socket; of a pin having heads at the opposite ends thereof, said pin being insertable within said sockets in a lateral direction; and means for detachably securing said pin in position.

In witness that we claim the foregoing, we have hereunto subscribed our names this 8th day of March, 1924.

GEORGE A. JOHNSON.
JOHN F. O'CONNOR.